US007012995B2

(12) United States Patent
Hatamura (10) Patent No.: US 7,012,995 B2
(45) Date of Patent: Mar. 14, 2006

(54) TELEPHONE SYSTEM HAVING MESSAGE RECORDING FUNCTION

(75) Inventor: Junji Hatamura, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 99 days.

(21) Appl. No.: 10/300,023

(22) Filed: Nov. 20, 2002

(65) Prior Publication Data

US 2003/0095640 A1    May 22, 2003

(30) Foreign Application Priority Data

Nov. 20, 2001 (JP) ............................. 2001-354535

(51) Int. Cl.
  *H04M 1/64*   (2006.01)
(52) U.S. Cl. ........................... 379/74; 455/413
(58) Field of Classification Search ............... 379/67.1, 379/70, 74, 79, 81, 88.23, 161, 164, 168
See application file for complete search history.

(56) References Cited

U.S. PATENT DOCUMENTS

| | | | | |
|---|---|---|---|---|
| 4,578,540 A | * | 3/1986 | Borg et al. | 379/40 |
| 5,506,891 A | * | 4/1996 | Brown | 379/100.06 |
| 5,579,377 A | * | 11/1996 | Rogers | 379/74 |
| 5,633,917 A | * | 5/1997 | Rogers | 379/74 |
| 5,960,066 A | * | 9/1999 | Hartmann et al. | 379/93.08 |
| 5,978,469 A | * | 11/1999 | Benson | 379/377 |
| 6,295,357 B1 | * | 9/2001 | Staples et al. | 379/418 |
| 6,370,236 B1 | * | 4/2002 | Cannon et al. | 379/74 |
| 6,611,681 B1 | * | 8/2003 | Henderson | 455/413 |
| 2002/0090961 A1 | * | 7/2002 | Walley et al. | 455/462 |
| 2002/0123326 A1 | * | 9/2002 | Iyengar et al. | 455/412 |

FOREIGN PATENT DOCUMENTS

| | | |
|---|---|---|
| JP | A 61-123349 | 6/1986 |
| JP | B2 2682530 | 8/1997 |
| JP | A 11-68933 | 3/1999 |
| JP | A-2001-105690 | 4/2001 |

\* cited by examiner

*Primary Examiner*—Fan Tsang
*Assistant Examiner*—Olisa Anwah
(74) *Attorney, Agent, or Firm*—Oliff & Berridge, PLC (57) ABSTRACT

A telephone system having a message recording function includes a message receiving system that is connectable to a calling station to the telephone system through a telephone line and receives a message transmitted from the calling station through the telephone line, a message storage in which the message received by the message receiving system is stored, a message reproducing system that retrieves and outputs a message stored in the message storage. With this configuration, the message reproducing system reproduces the message with the telephone line being in the off-hook state.

15 Claims, 5 Drawing Sheets

TELEPHONE SYSTEM HAVING MESSAGE RECORDING FUNCTION

BACKGROUND OF THE INVENTION

The present invention relates to a telephone system having a message recording function, which is capable of recording messages from callers and reproducing the recorded messages.

Conventionally, a telephone implemented with an answering machine has been known. The answering machine records messages of callers, which can be reproduced by a predetermined operation by a user of the answering machine, or the telephone.

Recently, a cordless telephone system is widespread. Typically, a cordless telephone system includes a base unit, which may have a facsimile function also, and one or more cordless handsets. Generally, each of the cordless handsets is placed on a charging cradle when it is not used. When the cordless handset is placed on the cradle, a rechargeable battery therein is charged by the cradle so that the cordless handset can always be fully charged and operable.

In such a cordless telephone system, the message recording function is implemented. Generally, the cordless telephone system is configured such that an answering machine is provided in the base unit, and reproduction of the recorded messages can be performed using each handset.

In the conventional cordless telephone system, a telephone line is in an off-hook state when the cordless handset are picked up from the cradle in view of the usability. However, in the conventional system, in order to reproduce the recorded messages through the cordless handset, generally, the telephone line should be in an on-hook state. Therefore, when the user intends to reproduce the recorded messages using the cordless handset, the user is required to operate the cordless handset to bring the line in the on-hook state, and then, the user operates to start reproducing the messages.

In addition, since the messages are reproduced with the telephone line being on-hook, if there is an incoming telephone call, the telephone system operates to receive the call. In such a case, the line is automatically brought into off-hook state and the reproduction of the messages should be interrupted.

SUMMARY OF THE INVENTION

The present invention is advantageous in that the cordless telephone system having the message recording function is provided, with which the recorded messages can be reproduced without being interrupted.

According to an aspect of the invention, there is provided a telephone system having a message recording function, which is provided with a message receiving system that is connectable to a calling station to the telephone system through a telephone line and receives a message transmitted from the calling station through the telephone line, a message storage in which the message received by the message receiving system is stored, a message reproducing system that retrieves and outputs a message stored in the message storage. Further provided are a first instructing system that instructs the message reproducing system to output a message with the telephone line being in an off-hook state, and a second instructing system that instructs the message reproducing system to output a message with the telephone line being in an on-hook state.

With this configuration, regardless whether the telephone line is on-hook or off-hook when the instruction to start the reproduction of messages is issued, the reproduction is performed. Therefore, additional operation is not required.

Optionally, the telephone system as above may be provided with a line condition detecting system that detects whether the telephone line is in a condition where a call from the telephone system can be made when a message is reproduced with the telephone line being in the off-hook state. Further, a condition changing system is provided. The line condition changing system brings the telephone line into the on-hook state, and then brings the telephone line into the off-hook state again a predetermined after the telephone line was brought into the on-hook state, when the line condition detects that the telephone line is in the condition where a call from the telephone line cannot be made.

With this configuration, it is ensured that the call can be made during the reproduction of the messages.

Further optionally, the telephone system may be provided with a caller telephone number storage that stores the telephone numbers of caller stations corresponding to messages stored in the message storage, the telephone numbers of caller stations being stored in relationship to the messages corresponding thereto, and a calling system that makes a call with reference to a telephone number stored in the caller telephone number storage when a message is reproduced and an instruction to make a call to the caller station corresponding to the reproduce message is made.

Still optionally, the telephone system may be provided with numeral keys through which numerals are input. Further provided are a dial input recognizing system that recognizes an operation of a numeral key as a part of dial number input, and a command input recognizing system that recognizes an operation of a numeral key as a command input. An output controlling system is further provided to actuate the message reproducing system when a key input is recognized as the command input by the command input recognizing system.

In this case, the command input recognizing system may recognize a key input as the command input when the key is operated for not less than a predetermined time period.

Still optionally, the telephone system may include a handset, and a cradle on which the handset is placed. The telephone system may be configured such that the telephone line is on-hook when the handset is placed on the cradle, and is off-hook when the handset is picked up from the cradle.

According to another aspect of the invention, there is provided a telephone system having a message recording function, which is provided with a message receiving system that is connectable to a calling station to the telephone system through a telephone line and receives a message transmitted from the calling station through the telephone line, a message storage in which the message received by the message receiving system is stored, a message reproducing system that retrieves and outputs a message stored in the message storage. With this configuration, the message reproducing system reproduces the message with the telephone line being in the off-hook state.

According to the configuration above, the messages are reproduced with the telephone line being in the off-hook state, the reproduction will not be disturbed by an incoming call to the telephone system.

Optionally, the message reproducing system may bring the telephone line into the off-hook state if reproduction of a message is instructed when the telephone line is in an on-hook state.

Thus, regardless whether the telephone line is on-hook or off-hook before the reproducing is executed, it is ensured that the reproduction is done under the off-hook state.

Still optionally, the telephone may further include a line condition detecting system that detects whether the telephone line is in a condition where a call from the telephone system can be made when a message is reproduced, and a condition changing system which changes the condition of the telephone line so that a call from the telephone system can be made immediately upon request.

Further optionally, the telephone system may include a line condition detecting system that detects whether the telephone line is in a condition where a call from the telephone system can be made when a message is reproduced with the telephone line being in the off-hook state, a condition changing system which brings the telephone line into the on-hook state, and then brings the telephone line into the off-hook state again a predetermined after the telephone line was brought into the on-hook state when the line condition detects that the telephone line is in the condition where a call from the telephone line cannot be made.

Furthermore, the telephone system may be provided with a caller telephone number storage that stores the telephone numbers of caller stations, each of the telephone numbers of caller stations being stored in relationship to a predetermined key. In this case, the message storage is configured to store each message in relationship to the same predetermined key assigned to a corresponding telephone number of a caller station.

With this configuration, based on the key, both the telephone number of a calling station, and the message transmitted therefrom can be identified.

In a particular case, the predetermined key may include date and time when the telephone system received each message.

Still optionally, the telephone system may include a calling system that makes a call with reference to a telephone number stored In the caller telephone number storage when a message is reproduced and an instruction to make a call to the caller station corresponding to the reproduce message is made.

Furthermore, the telephone system may be provided with numeral keys through which numerals are Input, an input recognizing system that recognizes a predetermined command is input when a predetermined operation of the numeral keys is performed, and an output controlling system that actuates the message reproducing system when the input recognizing system recognizes that the predetermined key operation of the numeral keys is performed.

According to a further aspect of the invention, there is provided a telephone system having a message recording function, the telephone system including a base unit having at least a telephone function and the message recording function, and at least one cordless handset having a message reproducing function. The base unit may include a message receiving system that is connectable to a calling station to the telephone system through a telephone line and receives a message transmitted from the calling station through the telephone line, and a message storage in which the message received by the message receiving system is stored. The at least one cordless handset may include a communicating system used for communicating with the base unit, data being exchanged using the communicating system, a message stored in the message storage being transmitted form the base unit to the at least one cordless handset using the communicating system, and a message reproducing system that reproduces the received message, and the message reproducing system reproduces the message with the telephone line being in the off-hook state.

Optionally, the at least one cordless handset may include a line condition detecting system that detects whether the telephone line is in a condition where a call from the telephone system can be made when a message is reproduced, and a condition changing system which changes the condition of the telephone line so that a call from the telephone system can be made immediately upon request.

Further optionally, the base unit may be provided with a caller telephone number storage that stores the telephone numbers of caller stations, each of the telephone numbers of caller stations being stored in relationship to a predetermined key, and the message storage is configured to store each message in relationship to the same predetermined key assigned to a corresponding telephone number of a caller station.

In a particular case, the predetermined key may include date and time when the telephone system received each message.

Still optionally, the at least one cordless handset may further include numeral keys through which numerals are input, an input recognizing system that recognizes a predetermined command is input when a predetermined operation of the numeral keys is performed, and an output controlling system that actuates the message reproducing system when the input recognizing system recognizes that the predetermined key operation of the numeral key is performed.

The telephone system may further include a cradle on which the at least one cordless handset is placed, the telephone line being on-hook when the at least one cordless handset is placed on the cradle, the telephone line being off-hook when the at least one cordless handset is picked up from the cradle.

According to a further aspect of the invention, there is provided a telephone system having a message recording function, which is provided with a message receiving system that is connectable to a calling station to the telephone system through a telephone line and receives a message transmitted from the calling station through the telephone line, a message storage in which the message received by the message receiving system is stored, a message reproducing system that retrieves and outputs a message stored in the message storage, an operable member that is operable by a user, and an instruction system that instructs, upon operation of the operable member, the message reproducing system to start reproducing the message stored in the message storage when the telephone line is in an off-hook state.

Optionally, the telephone system may be configured such that the instruction system is capable of instructing the message reproducing system to start reproducing the message when the telephone line is in an on-hook state.

In this case, the message reproducing system may bring the telephone line into the off-hook state if reproduction of a message is instructed when the telephone line is in the on-hook state.

Optionally, the message reproducing system reproduces the message with the telephone line being in the off-hook sate.

Further optionally, the telephone system may include a line condition detecting system that detects whether the telephone line is in a condition where a call from the telephone system can be made when a message is reproduced, and a condition changing system which changes the condition of the telephone line so that a call from the telephone system can be made immediately upon request.

DETAILED DESCRIPTION OF THE EMBODIMENT

Hereinafter, a cordless telephone system 1 having a message recording function according to an embodiment of the invention will be described with reference to the accompanying drawings.

Figure 1:
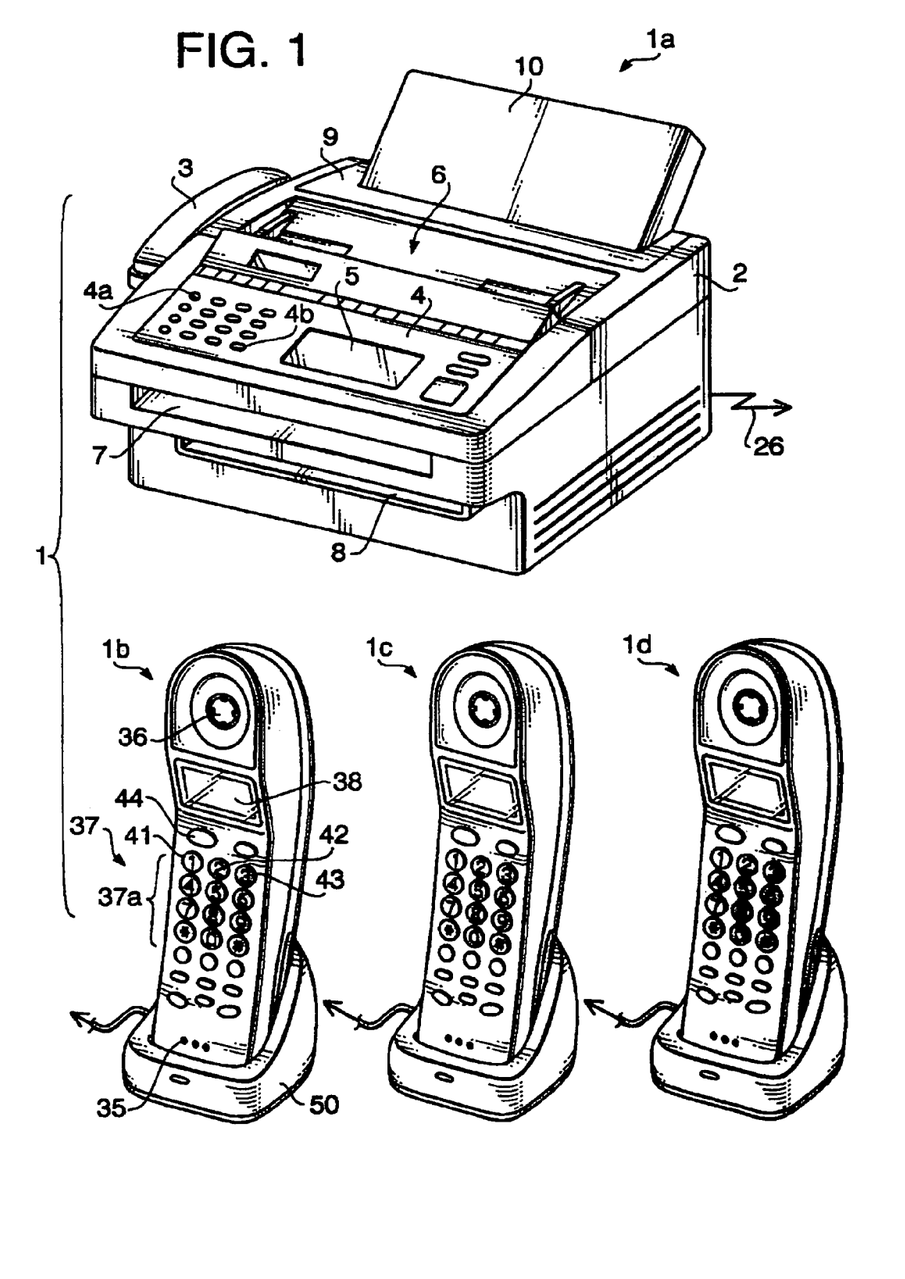
FIGS. 1a–1d are perspective views of a cordless telephone system including a base unit and three cordless handsets, according to an embodiment of the invention.

FIG. 1 is a perspective view of a cordless telephone system 1 including a base unit 1a and three cordless handsets 1b–1d, according to an embodiment of the invention.

The base unit 1a has a function of telephone and facsimile device. As will be described, the telephone system 1 is configured such that telephone numbers of called stations can be preliminarily recorded. Further, the telephone system 1 is compliant with a caller ID system. Accordingly, when it receives a telephone call, the telephone number of the calling station can be displayed.

The base unit 1a is a communication device capable of operating as a telephone and a facsimile device, and further, it can transmit/receive e-mail messages, through a telephone line 26.

The base unit 1a has a message recording function (also known as an answering function) so that it can record incoming messages of a caller connected through the telephone line 26, and reproduce recorded messages on request.

The base unit 1a has a may body 2, and a handset 3 is provided on one side of the main body 2. The handset 3 is placed on a hook (not shown) when not used (i.e., on-hook condition), and picked up therefrom (i.e., off-hook condition) when used.

On an upper surface of the main body 2, an operation panel 4 is provided. On the operation panel 4, a plurality of input buttons for inputting numbers/letters and a plurality of command buttons for Inputting operation commands are provided. On an upper-left portion of the operation panel 4 in FIG. 1, a setting button 4a, which is one of the command input buttons, is provided. When a user depresses the setting button 4a, a setting input window, through which the user can make various settings, is displayed on the LCD 5.

At a central area of the operation panel 4, the LCD 5 is provided. The LCD is provided with a touch panel. Operation status of the base unit 1a, connection status of the base unit 1a or the cordless handsets 1b–1d and the like are displayed on the LCD 5. Further, when the setting button 4a or numeric keys 4b are depressed, the operation status and/or operation guidance is displayed on the LCD 5.

By operating the buttons on the operation panel 4 and/or touching an image displayed on the LCD 5, on which the touch panel is provided, the user can input/modify the settings. Through the setting input window displayed on the LCD 4, the user can register telephone numbers with a telephone book memory 14a, which will be described later.

On a rear side with respect to the operation panel 4 and the LCD 5, an original inlet 6 is formed. Originals transmitted by facsimile are inserted from the original inlet 6 with their faces down, which are discharged from an original outlet 7 formed on a front surface of the main body 2.

Behind the original Inlet 6, a sheet holder receiving section 9 is provided. To the sheet holder receiving section 9, a sheet holder 10 accommodating a stuck of recording sheets is detachably coupled. The recording sheets are fed one by one in the base unit 1, images are printed thereon, and discharged from a sheet outlet 8, which is located below the original outlet 7.

The main body 2 includes a built-in antenna 18 (see FIG. 2) which is user for transmitting/receiving signals and data with respect to the cordless handsets 1b–1d. That is, the base unit 1a and the cordless handsets 1b–1d are connected by wireless communication, using radio waves. It should be noted that connection between the base unit 1a and the cordless handsets 1b–1d need not be limited to the wireless connection, and some or all of the cordless handsets may be connected to the base unit 1a through cables.

Each of the cordless handsets 1b–1d is provided with antenna 33 (see FIG. 2), for communicating with the base unit 1a. Each of the cordless handsets 1b–1d is capable of receiving the messages recorded in the base unit 1a through the wireless communication, and reproduces the same using a speaker 36 (see FIG. 2). The cordless handsets 1b–1d are configured such that, when a message is reproduced, a telephone number of a caller of the message is displayed, and a call to the displayed telephone number can be made easily. The calling function of the cordless handsets 1b–1d is achieved such that a predetermined command is transmitted to the base unit 1a, and the base unit 1a operates in accordance with the predetermined command.

Each of the cordless handset 1b–1d includes an operation panel 37 and an LCD 38. At a central area of the operation panel 37, a plurality of numeral keys 37a for inputting numerals and letters are provided. According to the embodiment, a button 42, which is the central button in the top row of the numeral keys 37a, functions as a command input button and as a button inputting a numeral "2". Specifically, when the button 42 is kept depressed for relatively short period (e.g., for less than two seconds), the input is recognized as input of numeral "two", while, if the button 42 is kept depressed for more than the predetermined period (e.g., for more than two seconds), the input is recognized as the command input. If the input is recognized as the command input, the command is interpreted as a request for reproduction of the recorded messages.

On an upper left portion with respect to the numeral keys 37a in FIG. 1, a start key 44 is provided. The start key 44 is used for bringing the telephone line 26 in the on-hook/off-hook state. If the start key 44 is depressed when the telephone line 26 is on-hook, the telephone line 26 is off-hook. If the start key 44 is depressed when the telephone line 26 is off-hook, the telephone line 26 is on-hook. Further, if the start key 44 is depressed when the telephone number of a caller (i.e., a calling station) of the reproduced message is displayed on the LCD 38, a call to the telephone number is made immediately.

On a bottom portion of the body of each cordless handset 1b–1d, a microphone 35 that converts sound signal (spoken sound of the user of the cordless handset) to an electrical signal is provided. On an upper portion of the body, the speaker 36 is provided. With this configuration, the cordless handsets 1b–1d enables communicate with the main unit 1a, and the calling station through the network 10.

As aforementioned, each of the cordless handsets 1b–1d is detachably coupled to, or placed on the charging cradle 50. When the cordless handset 1b (1c, 1d) is placed on the cradle 50, it is electrically connected through a connector 49 (see FIG. 2). Further, the cordless handset 1b (1c, 1d) is configured such that when it is electrically connected with the cradle 50 through the connector 49, its operation status is in on-hook state, while, when the cordless handset 1b (1c, 1d) is picked up (decoupled) from the charging cradle 50, its operation status is in off-hook state. That is, when each of the cordless handsets 1b–1d is picked up from the charging cradle 50, the telephone line is in the off-hook state.

As described above, when the button 42 is depressed for a long period, the message stored in the base unit 1a is reproduced at the cordless handset whose button 42 has been depressed. When the button 42 is depressed, the cordless handset may be placed on the charging cradle 50, or picked up therefrom. When the reproduction of the message is performed, if the cordless handset has been picked up from the cradle 50, the message is reproduced with the telephone line being in the off-hook state. If the button 42 is depressed for a long period with the cordless handset is placed on the charging cradle 50, the telephone line is in the on-hook state before the message is reproduced.

The charging cradle 50 charges a battery of the connected cordless handset at a predetermined voltage. The charging cradle 50 is connected to an external power source, and supplies the power from the external power source to the connected cordless handset.

Figure 2:
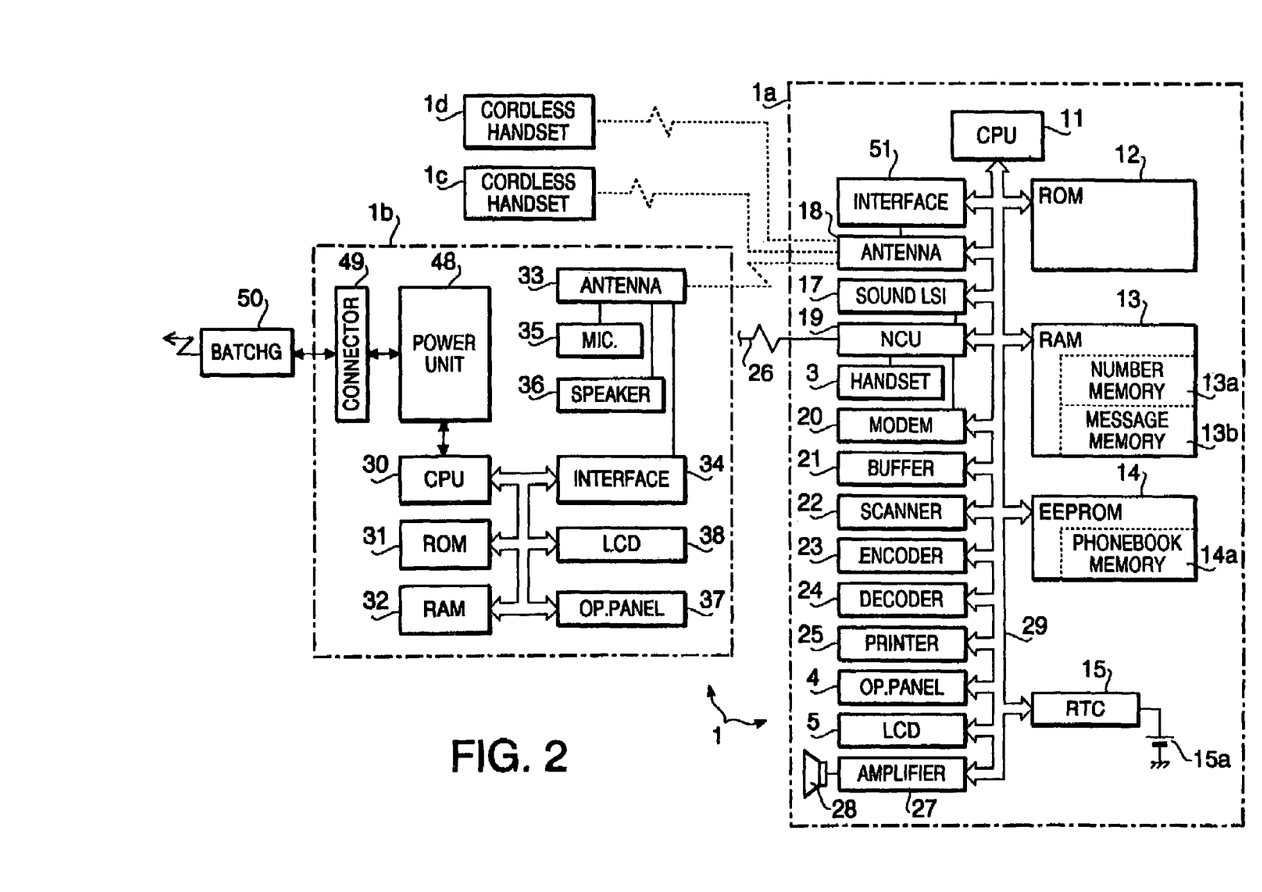
FIG. 2 a block diagram of the base unit and one of the cordless handsets shown in FIG. 1.

FIG. 2 a block diagram of the base unit 1a and one of the cordless handsets 1b–1d shown in FIG. 1. Since the cordless handsets 1b–1d are identical, only the block diagram of the cordless handset 1b is shown.

The base unit 1a includes a CPU 11, a ROM 12, a RAM 13, an EEPROM 14, an RTC (real time clock) 15, a sound LSI 17, an NTC (network control unit) 18, an interface 51, a modem 20, a buffer 21, a scanner 22, an encoder 23, a decoder 24, a printer 25, the operation panel 4, the LCD 5 and an amplifier 27, which are interconnected through a bus line 29.

The NCU 19 controls connection through the telephone line 26, and the base unit 1a is connected with the telephone line 26 through the NCU 19. The NCU 19 receives various signals including a ring signal transmitted from an exchange, transmits a dial signal for calling in response to the operation of the buttons provided on the operation panel 4 or 37, and exchanges analog voice signals and data communication when the telephone line 26 is in the off-hook state. As shown in FIG. 2, the NCU 19 is connected with the handset 3 of the base unit 1a.

The cordless telephone system 1 is compliant with the caller ID service. According to the caller ID service, when someone (i.e., a caller) make a call to the cordless telephone system 1, ID information, which is typically a phone number, of the calling device is transmitted from the exchange to the cordless telephone system 1. Typically, the telephone number (ID information) is transmitted immediately before the ring signal or in a silent period between ring signals. Therefore, the telephone number (ID information) is received by the NCU 19 before the handset 3 is picked up (i.e., with the handset is in on-hook state). The received telephone number is stored in a telephone number memory 13a, which will be described later.

The CPU 11 controls each component connected with the bus line 29, in accordance with various signals transmitted/received through the NCU 19 to execute sound/data communication (e.g., telephone, facsimile etc.). The CPU 11 executes programs to performs the above controls. The programs to be executed by the CPU 11 is stored in the ROM 12.

The message recording function (i.e., the answering machine function) is one of telephonic functions realized by the CPU 11. The message recording function is activated when the telephone system 1 is not brought into the off-hook state after a ringing sound is output by a predetermined times in response to reception of calling.

When the message recording function is activated, a message informing absence of the user is transmitted to the calling station, and receives the reply (i.e., a message) from the calling station. The reply is an incoming message representing a speech of a caller, which is sound data transmitted through the telephone line 26. If the caller does not speak in response to the message informing the absence of the user of the called station (i.e., the cordless telephone system 1), a silent message (no-sound message) is received as the incoming message.

The RAM 13 is a memory that temporarily stores various data. As indicated in FIG. 2, the RAM 13 includes the afore-mentioned telephone number memory 13a, and a message memory 13b. The telephone number memory 13a stores telephone numbers of callers, which are transmitted from the exchange.

When the cordless telephone system 1 receives the telephone number of the caller, the received telephone number is stored in the telephone number memory 13a and then displayed on the LCD 5 (LCD 38). Under this condition, if the user operates the handset 3 (1b, 1c or 1d) to bring the same into off-hook state, the telephone number (i.e., the number of the caller which is being connected) is deleted from the telephone number memory 13a.

If the called station is not brought into the off-hook state, and the message recording function is activated, the telephone number is stored in the telephone number memory 13a together with the date and time when the incoming message is received. The telephone number as stored together with the received date and time is deleted when the corresponding message is deleted.

The message memory 13b stores the messages transmitted from the calling stations. The messages transmitted through the telephone line 26 is an analog voice signal, which is converted into digital sound signal by a sound LSI (which will be described later), and is stored in the message memory 13b. It should be noted that each message is added with date and time when the message is received, and then stored in the message memory 13b. The date and time added to each message are the same as those added to the telephone number corresponding to the message. Therefore, when a message is to be output (reproduced), the corresponding telephone number can be identified using the date and time, and can easily be retrieved from the telephone number memory 13a. The messages stored in the message memory 13b are deleted in response to a predetermined operation by the user, respectively.

Further to the above, in a predetermined area of the RAM 13, decoded facsimile data is temporarily stored. The stored facsimile data is then transmitted to the printer 25. After the facsimile data is printed by the printer 25, the data is deleted from the RAM 13. Generally, facsimile data is relatively large in size. However, as described above, facsimile data is deleted conditional upon printing of the same. Therefore, the capacity of RAM 13 is efficiently used.

The EEPROM 14 is a non-rewritable, no-volatile memory. Data stored in the EEPROM 14 remains therein undeleted even if the power supply is turned OFF. The EEPROM 14 is therefore used for storing data which is registered/set by the user. That is, the EEPROM 14 is used for semi-permanently and rewritably storing such data.

The telephone book memory 14a stores the telephone numbers as desired by the user. According to the cordless telephone system 1, by operating input buttons such as numeral keys 4b with reference to the input window displayed on the LCD 5, the user can store the desired telephone numbers in the telephone book memory 14a. With a certain operation, any one of the telephone numbers can be displayed on the LCD 5, and with a simply key operation, a call to the displayed telephone number can be made without inputting the entire numerals through the numerical keys 4b.

The RTC 15 is an IC (integrated circuit) which counts date (year, month, day and a day of week) and time (hour, minute and second). As aforementioned, to a received message and to the corresponding telephone number, data indicative of date and time when the message is received is added, so that the message and the telephone number corresponding thereto can be managed. The RTC 15 is connected with a battery circuit 15a which supplies a back-up voltage to the RTC 15 in case the power of the base unit 1a is turned OFF. Since the battery circuit 15a is provided, even though the base unit 1a is powered OFF, the clock is keeps the date and time correctly.

The sound LSI 17 converts the analog sound signal received by the NCU 19 into a digital sound signal. Further, a digital sound signal generated inside the base unit 1a is converted by the sound LSI 17 into an analog sound signal, which is inputted to the NCU 19. When the messages stored in the message memory 13b are output (reproduced), the sound LSI 17 converts the digitalized messages stored in the message memory 13b into an analog sound signal. The analog-converted sound signal (i.e., message) is output from the speakers 28 or 36.

The interface 51 interfaces data communication between devices and complies with a predetermined electrical characteristic. The signal transmitted from the base unit 1a to each of the cordless handsets 1b–1d is received by the antenna 18, and then input to the CPU 11 through the interface 51.

The modem 20 modulates/demodulates signals representative of image data and/or e-mail data. Further, the modem 20 transmits/receives communication procedure signals for controlling data communication. The buffer 21 is a memory temporarily storing encoded facsimile data which is exchanged from/to another facsimile device through the telephone line 26, image data of an original scanned by the scanner 22, and the like.

The scanner 22 scans originals which are inserted from the original inlet 6. The encoder 23 encodes the image data of the original scanned by the scanner 23. The decoder 24 retrieves the facsimile data as received and stored in the buffer 21, and decodes the same. The decoded data is temporarily stored in the RAM 13, and then transmitted to the printer 25, which prints the image on a recording sheet.

The operation panel 4 is, as described above, subject to operation of the user of the base unit 1a. The amplifier 27 amplifies a sound signal so that the ringing sound, audio messages and the like are output by the speaker 28 connected to the amplifier 27.

Next, the configuration of the cordless handset 1b (1c, 1d) will be described with reference to FIG. 2. As aforementioned, since the cordless handsets 1b–1d have the identical configuration, only the cordless handset 1b will be described.

The cordless handset 1b has a CPU 30, a ROM 31, a RAM 32, an interface 34, the operation panel 37 and the LCD 38, which are interconnected with each other.

The CPU 30 controls each components of the cordless handset 1b in accordance with commands input by the user and various signals transmitted from the base unit 1a through the interface 34. The CPU 30 performs the controls by executing programs, which are stored in the ROM 31. A message reproducing procedure for reproducing message using the cordless handset 1b, which will be described later, is also stored in the ROM 31 as a part of the control programs. The RAM 32 temporarily stored various data.

The antenna 33 is used when data communication is performed between the base unit 1a and the cordless handset 1b (1c, 1d). The antenna 33 is connected to the interface 34, the microphone 35, and the speaker 36. The analog signal output by the base unit 1a is received by the antenna 33, and then transmitted to the speaker 36. The analog signal generated by the microphone 35 is transmitted to the base unit 1a from the antenna.

The interface 34 interfaces data communication between devices. In particular, the interface 34 is used for communicating with the base unit 1a to transmit/receive data. Signals transmitted from the cordless handset 1b to the base unit 1a are transmitted through the interface 34 and the antenna 33, while the signals transmitted from the base unit 1a to the cordless handset 1b are received through the antenna 33, and input to the CPU 30 through the CPU 30.

The cordless handset 1b is configured to be electrically connected with the charging cradle 50 through the connector 49. When the connector 49 connects the charging cradle 50, the cordless handset 1b is supplied with power from an external power source. The power is supplied to a power unit 48 through the connector 49. The power unit 48 is provided with a secondary battery (rechargeable battery), which is charged with the supplied power. Since the cordless handset 1b is usually placed on the charging cradle 50 and thus the secondary battery is always charged, when the cordless handset 1b is picked up from the charging cradle 50, it is ensured that the cordless handset 1b is operable (powered).

The CPU 30 monitors a connection between the connector 49 with the charging cradle 50. If the CPU 30 detects that the connector 49 is disconnected from the charging cradle 50, the CPU 30 brings the telephone line 26 in the off-hook state. If the CPU 30 detects that the disconnected connector 49 is re-connected with the charging cradle 50, the CPU 30 brings the telephone line 26 in on-hook state.

Next, with reference to flowcharts shown in FIGS. 3A, 3B and 4, the REPRODUCTION PROCEDURE performed by each of the cordless handsets 1b–1d will be described.

Figure 3A:
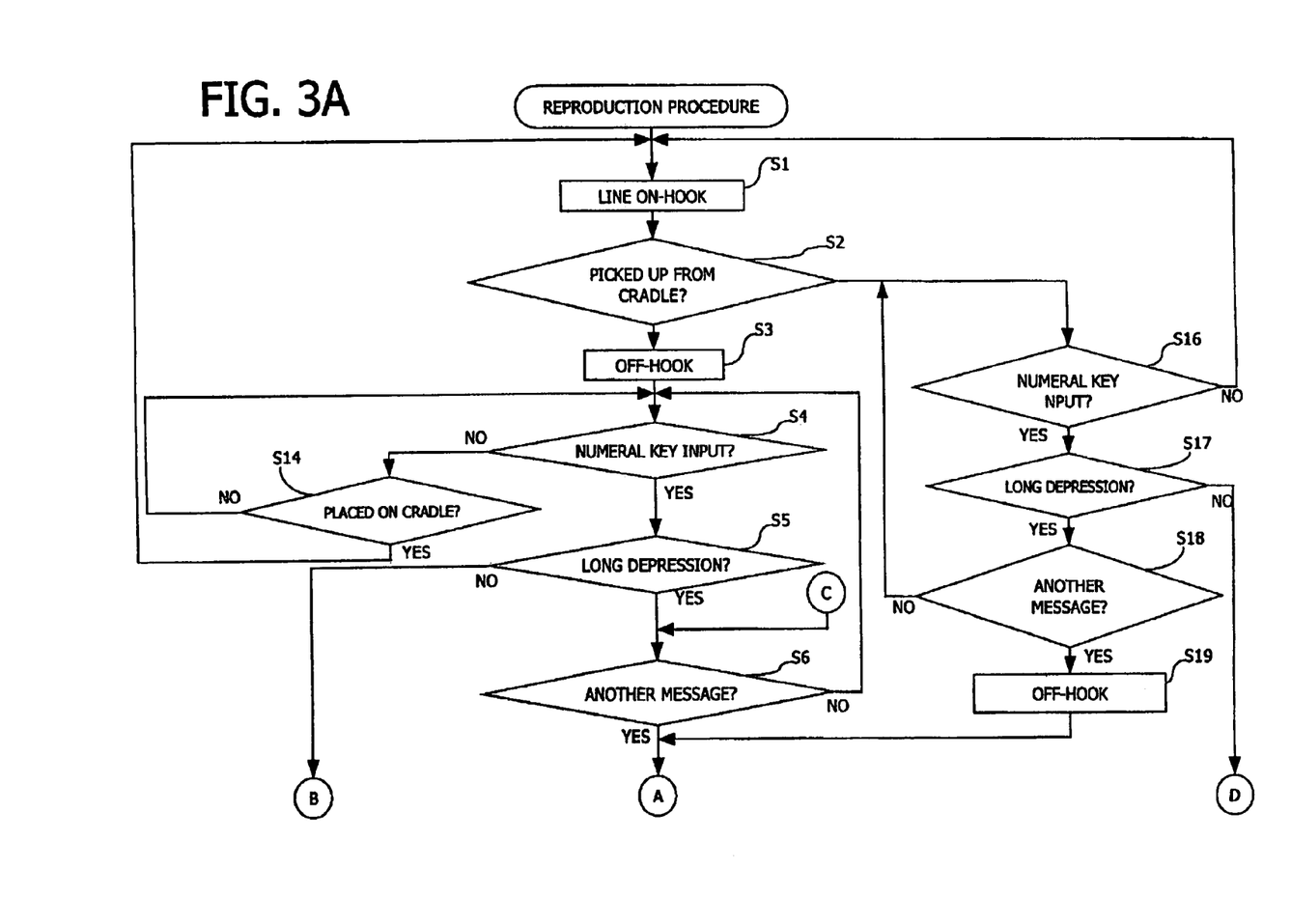
FIGS. 3A and 3B show a flowchart illustrating a REPRODUCTION PROCEDURE performed by the cordless handset.
Figure 3B:
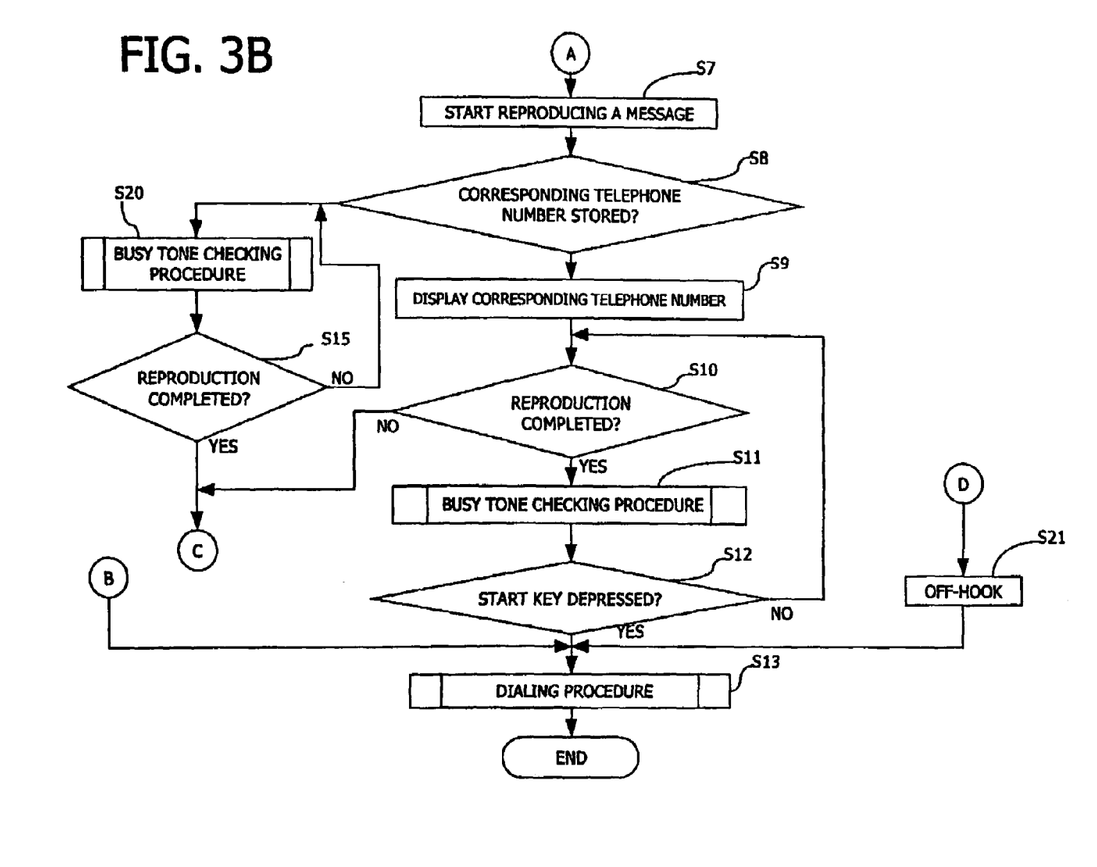
Figure 4:
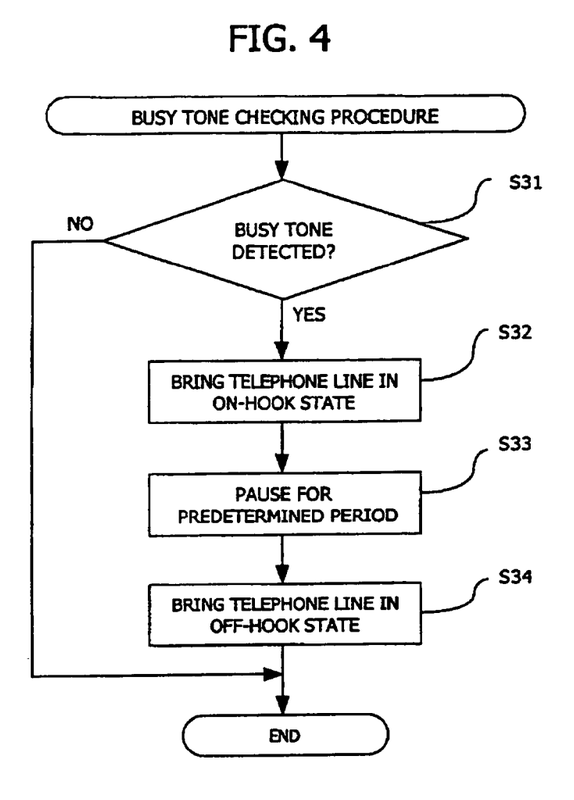
FIG. 4 is a flowchart illustrating a BUSY TONE CHECK PROCEDURE called in the REPRODUCTION PROCEDURE.

FIGS. 3A and 3B show a flowchart illustrating a REPRODUCTION PROCEDURE performed by the cordless handset, and FIG. 4 is a flowchart illustrating a BUSY TONE CHECK PROCEDURE which is called in the REPRODUCTION PROCEDURE.

The REPRODUCTION PROCEDUR performed by the cordless handset 1b (1c, 1d) is a procedure for reproducing the stored message at the cordless handset 1b (1c, 1d). As described above, when the message recording function is activated in the cordless telephone system 1, the message of the caller is stored in the message memory 13b of the base unit 1a. In the REPRODUCTION PROCEDURE performed by the cordless handset 1b (1c, 1d), retrieval of a message stored in the message memory 13a, and transmission of the retrieved message to the cordless handset 1b (1c, 1d) are instructed to the base unit 1a.

Referring to FIGS. 3A and 3B, when the cordless handset 1b (1c, 1d) is placed on the charging cradle 50 and the connector 49 is electrically connected to the charging cradle 50, the telephone line 26 is on-hook (S1). This state of the cordless handset 1b (1c, 1d) will be referred to as a stand-by state of the cordless handset 1b (1c, 1d).

In S2, it is judged whether the cordless handset 1b (1c. 1d) is picked up from the charging cradle 50. If the cordless handset 1b (1c, 1d) is picked up (S2: YES), the telephone line 26 is in the off-hook state (S3). The status of the telephone line 26 is established as instruction command is transmitted from the cordless handset 1b (1c, 1d) to the base unit 1a.

In S4, it is judged whether numerical keys 37a are operated. If a numerical key 37a is operated (S4: YES), it is judged whether the key operation is a long-depression of the reproduction button (i.e., button 42) in S5. If the key operation is the long-depression of the reproduction button (S5: YES), it means a request for reproduction of a message. In this case, it is judged, in S6, whether another message is recorded (when the procedure is executed first time, whether a message is present) is examined. If there is another message recorded (S6: YES), reproduction of the message is started (i.e., the message is output as an audio wave from the speaker 36).

With this configuration, when the cordless handset 1b (1c, 1d) is picked up from the charging cradle 50, the telephone line 26 is off-hook, and reproduction of the message is performed with the telephone line being off-hook, the reproduction can be performed without being disturbed. It should be noted that, if the message is reproduced with the telephone line 26 being on-hook, there may be a call from a calling station, and in such a case a procedure for receiving the call may be automatically executed during the reproduction of the message. Then, the reproduction may be interrupted. According to the embodiment, the reproduction of the message can be done with the telephone line being off-hook. Therefore, the reproduction may not be disturbed by reception of calls from other stations. The reproduction of the message at the cordless handset 1b (1c, 1d) is performed as data communication is performed between the base unit 1a and the cordless handset 1b (1c, 1d).

In S8, it is judged whether a telephone number corresponding to the reproduced message is stored in the telephone number memory 13a. If the corresponding telephone number is stored in the telephone number memory 13a (S8: YES), the cordless handset 1b (1c, 1d) requires the base unit 1a to transmit the telephone number thereto, and displays the received telephone number on the LCD 38 (S9). In S10, it is judged whether the reproduction of the message is completed. If the reproduction of the message is not finished (S10: NO), a busy tone checking procedure is called in S11. In the busy tone checking procedure, a busy tone is detected, and a condition where a call cannot be made is eliminated, which will be described later with reference to the flowchart shown in FIG. 4. It should be noted that, in order to allow the user to operate the start key 44 after the reproduction of the message is finished, it is preferable that, in S10, it is judged whether a predetermined period (e.g., one second) has elapsed since the reproduction of the message was completed.

In S12, it is judged whether the start key 44 is depressed while the steps S10, S11 and S12 are executed. If the start key 44 has been depressed (S12: YES), dialing of the telephone number displayed on the LCD 38 is executed (S13), and the REPRODUCTION PROCEDURE is terminated.

As described above, with the BUSY TONE CHECKING PROCEDURE, a condition where a call cannot be made is eliminated. Therefore, the off-hook state is kept with enabling a condition where a call can be made. Therefore, when the user operates the start key 44 to call the caller (calling station) of the reproduced message, the call can be made immediately.

If the operated key is not a numerical key 37a (S4: NO), it is judged whether the cordless handset 1b (1c, 1d) is placed on the charging cradle 50 (S14). If the cordless handset 1b (1c, 1d) is placed on the charging cradle 50 (S14: YES), control proceeds to S11, where the telephone line is in the on-hook state. If the cordless handset 1b (1c, 1d) is not placed on the charging cradle 50 (S14: NO), control proceeds to S4 and waits until a numerical key 37a is operated or the cordless handset 1b (1c, 1d) is placed back onto the charging cradle 50.

In S5, if the reproduction button (button 42) is not long-depressed (S5: NO), control proceeds to S13, where the dialing is executed. In S6, if no other message is stored in the message memory 13b (S6: NO), control proceeds to S4. In S8, if the telephone number corresponding to the reproduced message is not stored in the telephone number memory 13a (S8: NO), control proceeds to S11 and calls the BUSY TONE CHECKING PROCEDURE. After the busy tone checking procedure is performed, it is judged whether the reproduction of the message is completed in S15. If the reproduction is completed (S15: YES), control proceeds to S6. If the reproduction has not yet been completed (S15: NO), control proceeds to S11, and until the completion of the reproduction of the message, a loop consisting of steps S11 and S15 is repeated.

In S10, if the reproduction of the message is completed (S10: YES), control proceeds to S6. In S12, if the start key 44 has not yet been depressed (S12: NO), control proceeds to S10 and waits until the reproduction of the message is completed or the start key 44 is depressed.

The reproduction of messages when the cordless handset 1b (1c, 1d) is picked up from the charging cradle 50 is executed as described above (in S1 through S15).

Next, the reproduction of messages when the cordless handset 1b (1c, 1d) is stayed on the charging cradle 50 will be described.

If it is judged that the cordless handset 1b (1c, 1d) is not picked up from the charging cradle (S2: NO), control proceeds to S16. It should be noted that, during the stand-by sate, control proceeds from S2 to S3.

In S16, it is judged whether a numeral keys 37a is operated. If a numeral key 37a is operated (S16: YES), it is judged whether the operation is a long-depression of the reproduction button (i.e., button 42) (S17). If the operation is the long-depression of the reproduction button (button 42) (S17: YES), similar to S6, it is judged whether another message is stored in the message memory 13b of the base unit 1a (S18). It should be noted that when the procedure shown in FIGS. 3A and 3B is executed first time, the first message is regarded as the "another message".

If there is another message stored in the message memory 13b (S18: YES), the telephone line 26 is off-hook (S19), and control proceeds to S7. With this procedure, even though the user operates the cordless handset 1b (1c, 1d) to initiate the reproduction procedure with the cordless handset being placed on the charging cradle 50, the telephone line 26 is in the off-hook state before the reproduction is started. As a result, since the reproduction is executed under off-hook condition similarly to a case where the operation to start reproduction with the cordless handset 1b (1c, 1d) picked up from the charging cradle, the telephone line 26 is in the off-hook state, and the reproduction will not be disturbed by a call from another station.

If it is judged that a numerical key 37a is not operated (S16: NO), control proceeds to S1. In S17, if it is judged that the operation is not the long-depression of the reproduction button (button 42) (S17: NO), the key input is intended to dial a phone number. Accordingly, in this case, the telephone line 26 is in the off-hook state (S21), and control proceeds to S13 for dialing. In S18, if it is judged that there is no further message in the message memory 13b (S18: NO), control proceeds to S16 to wait for input through a numeral key 37a.

If the reproduction of the messages are performed under on-hook state, when a call is received, a reception procedure is automatically executed. In particular, the reproduction of the message is an audible output, even though the reproduction is kept performed, the sound of the message and ringing tones are overlapped, which causes difficulty in listening to the message.

FIG. 4 is the BUSY TONE CHECKING PROCEDURE which is called in S11 or 520 of the flowchart shown in FIGS. 3A and 3B.

As described above, according to the embodiment, the reproduction of the recorded messages can be executed under the off-hook condition. Generally, when the off-hook condition is kept for more than a predetermined time period without dial tones, the telephone line is brought into a condition where a call cannot be made. In such a case, a busy tone is received through the telephone line 26.

The BUSY TONE CHECKING PROCEDURE is for detecting such a condition, and if detected, to eliminate the condition.

In S31, it is checked whether the busy tone is detected. If the busy tone is detected (S31: YES), the telephone line 26 is in the on-hook state (S32), and then, control pauses for a predetermined period (e.g., six seconds) in S33. It is known that, when the condition of the telephone line 26 is changed from the off-hook state to the on-hook state, it cannot be changed to the off-hook state again immediately. Accordingly, in this procedure, a pause period (S33) is provided. Thereafter, the telephone line 26 is in the off-hook state in S34, and the procedure is terminated. If it is judged that no busy tone is generated (S31: NO), no further steps are executed and the procedure is terminated immediately.

As described above, with the cordless telephone system 1 according to the embodiment of the invention, the messages can be reproduced under the off-hook state. Therefore, when the reproduction is performed by operating the cordless handset 1b (1c, 1d), it is not necessary to operate the handset to open the telephone line, and the reproduction of messages can be started immediately. Since the reproduction is performed under the off-hook state, the reproduction will not be disturbed by incoming calls. Further, during the reproduction procedure, the BUSY TONE CHECKING PROCEDURE described above is executed so that the a call can be emitted immediately if operated since a condition where the call cannot be made is eliminated by the BUSY TONE CHECKING PROCEDURE.

The present invention is explained with reference to the exemplary embodiment. It should be stressed that the invention is not limited to the configuration described above, and various modifications can be made without departing from the gist of the invention.

In the above-described embodiment, when the message is output at the cordless handsets 1b–1d, if the telephone number corresponding to the output message is stored in the telephone number memory 13a, the telephone number is displayed on the LCD 38. This can be modified such that the only when the telephone number stored in the telephone number memory 13a is registered with the telephone book memory 14a. Generally, any call is received unless a setting is made to reject calls for certain caller. Therefore, even calls having less importance, for example, calls directed to sales or campaigns are also received. Accordingly, telephone numbers which are unnecessary for the user are also stored in the telephone number memory 13a. In the telephone book memory 14a, the user stores the telephone numbers which are important and/or necessary for the user. Therefore, with the above-described modification, only the important and/or necessary telephone numbers are displayed on the LCD 38 when the messages are reproduced. With this configuration, the user can distinguish the important messages from unnecessary or less important messages.

In the above-described embodiment, a case where the messages are reproduced at the cordless handsets 1b–1d is described. It should be noted that, even when the messages are reproduced by the base unit 1a, the similar control is applicable. That is, the base unit 1a may be configured such that the messages are reproduced with the telephone line being off-hook. Further, the telephone numbers corresponding to the messages may be displayed, calls to the displayed numbers can be made with a simple operation, and the busy tone checking procedure may be executed.

According to the embodiment, the long-depression of the reproduction key (button 42) is recognized as the input of a command initiating the reproduction of the messages. The invention is not limited to this configuration and various modification can be made. Alternatively or optionally with respect to the configuration described above, for example, the cordless handset may be provided with a dedicated operable member, operation of which initiating the reproduction of the messages. Alternatively or optionally, a combination of two keys (i.e., simultaneous depression of two keys) may be regarded as the input of the command. A user who is not familiar with operation of the cordless handset may tend to depress each button for relatively long period even when the user dials a telephone number. In such a case, such an operation of a button may be erroneously recognized as the input of the command. If the cordless handset is configured such that the simultaneous operation of two keys inputs the command, such a erroneous recognition can be eliminated, and the command input and dialing operation can be distinguished without fail. In this case, the two keys to be simultaneously depressed may be predetermined keys, or any two keys.

In the above-described embodiment, when the reproduction of the messages is performed, regardless whether the cordless handset is placed on or picked up from the charging cradle 50, the telephone line is in the off-hook state. Alternatively, the configuration may be modified such that when the cordless handset is placed on the charge cradle 50, step S19 is skipped and the reproduction is performed with the telephone line being in the on-hook state. In a normal use, when the cordless handset is placed on the charging cradle 50, the telephone system 1 is ready to receive a call. According to this modification, although the message is being reproduced, a call can be received when the cordless handset is on the cradle.

Further, according to the embodiment, the messages stored in the message memory 13b are deleted when a predetermined operation is performed. Alternatively, it is modified such that a messages is deleted when dialing operation (calling operation) corresponding to the message is performed. Execution of dialing (calling) to a caller of the message implies that the user has listened to the message corresponding to the telephone number, and thus, the message is no more necessary and can be deleted. If a plurality of messages including those the user has already listened to are stored in the memory, the use is required to perform additional operation to listen to messages new to the user. Therefore, it is convenient, if the unnecessary messages are automatically deleted.

According to the embodiment, the messages can be reproduced with the telephone line being in the off-hook state. The telephone system may be enhanced such that, if the reproduction of a message is initiated when the telephone lines is connected, the reproduced message is transmitted to the telephone lines so that users of the calling and called stations can listen to the message.

The busy tone checking procedure is incorporated to eliminate the condition where the telephone line is in the off-hook state and a call cannot be made. The condition is checked by detecting the busy tone. This may be modified that occurrence of such a condition is checked by detecting the absence of the dial tone.

The messages may not be limited to the sound messages, but may include data messages such as e-mail messages. In this case, when the contents of e-mail messages received by the base unit 1a are reviewed with the cordless handset, regardless whether the cordless handset is placed on or picked up from the charging cradle, an instruction to transmits the e-mail messages to the base unit 1a, without additional operation such as bringing the telephone line into on-hook state being required.

The present disclosure relates to the subject matter contained in Japanese Patent Application No. 2001-354535, filed on Nov. 20, 2001, which is expressly incorporated herein by reference in its entirety.

What is claimed is:

1. A telephone system having a message recording function, comprising:
  a message receiving system that is connectable to a calling station through a telephone line and capable of receiving a message transmitted from the calling station through the telephone line when in a connected state;
  a message storage in which the message received by the message receiving system is stored;
  a message reproducing system that retrieves and outputs a message stored in the message storage;
  a line condition detecting system that detects whether the telephone line is in a condition where a call from said telephone system can be made when a message is reproduced with the telephone line being in the off-hook state;
  a condition changing system which brings the telephone line into the on-hook state, and then brings the telephone line into the off-hook state again a predetermined time after the telephone line was brought into the on-hook state when the line condition detects that the telephone line is in the condition where a call from said telephone line cannot be made; and
  at least one handset placed on a cradle, the telephone line being in an on-hook state when said at least one handset is placed on the cradle, the telephone line being set to an off-hook state when said at least one handset is picked up from the cradle;
  said at least one handset including an instructing system that instructs said message reproducing system to output a message,
  wherein said message reproducing system sets the telephone line in the off-hook state when the message stored therein is reproduced.

2. The telephone system according to claim 1, further comprising:
  a caller telephone number storage that stores the telephone numbers of caller stations corresponding to messages stored in said message storage, the telephone numbers of caller stations being stored in relationship to the messages corresponding thereto; and
  a calling system that makes a call with reference to a telephone number stored in said caller telephone number storage when a message is reproduced and an instruction to make a call to the caller station corresponding to the reproduce message is made.

3. The telephone system according to claim 1, further comprising:
  numeral keys through which numerals are input;
  a dial input recognizing system that recognizes an operation of a numeral key as a part of dial number input;
  a command input recognizing system that recognizes an operation of a numeral key as a command input; and
  an output controlling system that actuates said message reproducing system when a key input is recognized as the command input by said command input recognizing system.

4. The telephone system according to claim 3, wherein said command input recognizing system recognizes a key input as the command input when the key is operated for not less than a predetermined time period.

5. A telephone system having a message recording function, comprising:
  a message receiving system that is connectable to a calling station through a telephone line and capable of receiving a message transmitted from the calling station through the telephone line when in a connected state;
  a message storage in which the message received by the message receiving system is stored;
  a message reproducing system that retrieves and outputs the message stored in the message storage;
  a line condition detecting system that detects whether the telephone line is in a condition where a call from said telephone system can be made when a message is reproduced with the telephone line being in the off-hook state;
  a condition changing system which brings the telephone line into the on-hook state, and then brings the telephone line into the off-hook state again a predetermined time after the telephone line was brought into the on-hook state when the line condition detects that the telephone line is in the condition where a call from said telephone line cannot be made; and
  at least one handset placed on a cradle, the telephone line being in an on-hook state when said at least one handset is placed on the cradle, the telephone line being set to an off-hook state when said at least one handset is picked up from the cradle;
  wherein said at least one handset includes:
    a first instructing system that instructs said message reproducing system to output the message when the at least one handset is placed on the cradle; and
    a second instructing system that instructs said message reproducing system to output the message when the at least one handset is picked up from the cradle, and
  wherein said message reproducing system reproduces the message with the telephone line being in the off-hook state regardless whether the reproduction of the message is instructed by the first instructing system or the second instructing system.

6. The telephone system according to claim 5, wherein said message reproducing system brings the telephone line into the off-hook state if reproduction of a message is instructed when the telephone line is in an on-hook state.

7. The telephone system according to claim 5, further comprising:
   a line condition detecting system that detects whether the telephone line is in a condition where a call from said telephone system can be made when a message is reproduced; and
   a condition changing system which changes the condition of the telephone line so that a call from said telephone system can be made immediately upon request.

8. The telephone system according to claim 5, further comprising:
   a caller telephone number storage that stores the telephone numbers of caller stations, each of the telephone numbers of caller stations being stored in relationship to a predetermined key,
   wherein said message storage stores each message in relationship to the same predetermined key assigned to a corresponding telephone number of a caller station.

9. The telephone system according to claim 8, wherein the predetermined key includes date and time when said telephone system received each message.

10. The telephone system according to claim 5, further including a calling system that makes a call with reference to a telephone number stored in said caller telephone number storage when a message is reproduced and an instruction to make a call to the caller station corresponding to the reproduce message is made.

11. The telephone system according to claim 5, further comprising:
   numeral keys through which numerals are input;
   an input recognizing system that recognizes a predetermined command is input when a predetermined operation of the numeral keys is performed; and
   an output controlling system that actuates said message reproducing system when said input recognizing system recognizes that the predetermined key operation of the numeral keys is performed.

12. A telephone system having a message recording function, comprising:
   a message receiving system that is connectable to a calling station through a telephone line and capable of receiving a message transmitted from the calling station through the telephone line when in a connected state;
   a message storage in which the message received by the message receiving system is stored;
   a message reproducing system that retrieves and outputs a message stored in the message storage;
   a first instructing system that instructs said message reproducing system to output a message with the telephone line being in an off-hook state;
   a second instructing system that instructs said message reproducing system to output a message with the telephone line being in an on-hook state;
   a line condition detecting system that detects whether the telephone line is in a condition where a call from said telephone system can be made when a message is reproduced with the telephone line being in the off-hook state; and
   a condition changing system which brings the telephone line into the on-hook state, and then brings the telephone line into the off-hook state again a predetermined time after the telephone line was brought into the on-hook state when the line condition detects that the telephone line is in the condition where a call from said telephone line cannot be made.

13. The telephone system according to claim 12, further comprising:
   a caller telephone number storage that stores the telephone numbers of caller stations corresponding to message stored in said message storage, the telephone numbers of caller stations being stored in relationship to the messages corresponding thereto; and
   a calling system that makes a call with reference to a telephone number stored in said caller telephone number storage when a message is reproduced and an instruction to make a call to the caller station corresponding to the reproduced message is made.

14. The telephone system according to claim 12, further comprising:
   numeral keys through which numerals are input;
   a dial input recognizing system that recognizes an operation of a numeral key as a part of dial number input;
   a command input recognizing system that recognizes an operation of a numeral key as a command input; and
   an output controlling system that actuates said message reproducing system when a key input is recognized as the command input by said command input recognizing system.

15. The telephone system according to claim 14, wherein said command input recognizing system recognizes a key input as the command input when the key is operated for not less than a predetermined time period.

* * * * *